US010810024B2

(12) United States Patent
Yan et al.

(10) Patent No.: US 10,810,024 B2
(45) Date of Patent: Oct. 20, 2020

(54) REDIRECTION METHOD AND APPARATUS, AND SYSTEM

(71) Applicant: Huawei Technologies Co., Ltd., Shenzhen (CN)

(72) Inventors: Wei Yan, Shenzhen (CN); Qiang Zheng, Shenzhen (CN); Pu Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 16/131,689

(22) Filed: Sep. 14, 2018

(65) Prior Publication Data

US 2019/0026131 A1 Jan. 24, 2019

Related U.S. Application Data

(63) Continuation of application No. PCT/CN2016/015955, filed on Nov. 15, 2016.

(30) Foreign Application Priority Data

Mar. 17, 2016 (CN) .......................... 2016 1 0158900

(51) Int. Cl.
*G06F 15/16* (2006.01)
*G06F 9/451* (2018.01)
(Continued)

(52) U.S. Cl.
CPC .............. *G06F 9/452* (2018.02); *G06F 9/445* (2013.01); *G06F 9/45558* (2013.01); *H04L 67/38* (2013.01); *G06F 2009/45595* (2013.01)

(58) Field of Classification Search
CPC ...... G06F 9/452; G06F 9/445; G06F 9/45558; G06F 2009/45595; H04L 67/38
See application file for complete search history.

(56) References Cited

U.S. PATENT DOCUMENTS 6,253,256 B1 * 6/2001 Wollrath ................. G06F 9/542
719/330
7,318,229 B1 * 1/2008 Connor ................... G06F 9/548
719/330
(Continued)

FOREIGN PATENT DOCUMENTS

CN 102508796 A 6/2012
CN 102521027 A 6/2012
(Continued)

OTHER PUBLICATIONS

Machine Translation and Abstract of Chinese Publication No. CN105183675, Dec. 23, 2015, 40 pages.
(Continued)

*Primary Examiner* — Richard G Keehn
(74) *Attorney, Agent, or Firm* — Conley Rose, P.C.

(57) ABSTRACT

A redirection method and apparatus, and a system, where the method includes capturing, by a virtual machine running on a server, an interface invocation request initiated by an application program, encapsulating, by the virtual machine, a serialization result into a data packet, sending the data packet to a client device, where the serialization result is obtained after serialization of an interface name and an interface parameter included in the interface invocation request, reconstructing, by the client device based on the serialization result and the interface name that are included in the data packet, the interface invocation request, and accessing a human interface device based on the interface invocation request to implement redirection for the human interface device. Hence, the redirection method improves stability of a redirection process.

20 Claims, 8 Drawing Sheets

(51) Int. Cl.
*G06F 9/445* (2018.01)
*G06F 9/455* (2018.01)
*H04L 29/06* (2006.01)

(56) References Cited

U.S. PATENT DOCUMENTS

| | | | | |
|---|---|---|---|---|
| 7,444,536 | B1* | 10/2008 | Jairath | G06F 9/465 |
| | | | | 714/4.11 |
| 8,839,266 | B1* | 9/2014 | Partridge | G06F 13/00 |
| | | | | 719/310 |
| 9,753,704 | B2* | 9/2017 | Chen | G06F 8/10 |
| 9,800,466 | B1* | 10/2017 | Rangole | H04L 41/5009 |
| 10,075,336 | B2* | 9/2018 | Rao | H04L 25/03 |
| 2005/0229189 | A1* | 10/2005 | McManus | G06F 8/00 |
| | | | | 719/330 |
| 2007/0177028 | A1* | 8/2007 | Kyoung | G06F 3/005 |
| | | | | 348/222.1 |
| 2008/0022267 | A1* | 1/2008 | Johnson, Jr. | G06F 8/38 |
| | | | | 717/143 |
| 2009/0319497 | A1* | 12/2009 | Bolognese | G06F 9/547 |
| 2009/0320045 | A1* | 12/2009 | Griffith | H04L 67/34 |
| | | | | 719/315 |
| 2010/0083277 | A1* | 4/2010 | Malladi | G06F 9/541 |
| | | | | 719/313 |
| 2010/0083281 | A1* | 4/2010 | Malladi | H04L 67/34 |
| | | | | 719/317 |
| 2011/0138381 | A1* | 6/2011 | Hauser | G06F 9/4862 |
| | | | | 718/1 |
| 2013/0061044 | A1* | 3/2013 | Pinkus | H04L 67/12 |
| | | | | 713/160 |
| 2013/0111561 | A1* | 5/2013 | Kaushik | H04L 63/105 |
| | | | | 726/4 |
| 2014/0373098 | A1* | 12/2014 | Fausak | H04L 63/10 |
| | | | | 726/4 |
| 2015/0113528 | A1* | 4/2015 | Kim | G06F 9/452 |
| | | | | 718/1 |
| 2015/0281355 | A1* | 10/2015 | Maturana | H04L 67/1097 |
| | | | | 709/202 |
| 2016/0088109 | A1 | 3/2016 | Chen et al. | |

FOREIGN PATENT DOCUMENTS

| | | | | |
|---|---|---|---|---|
| CN | 102722678 | A | 10/2012 | |
| CN | 103473113 | A | 12/2013 | |
| CN | 103763610 | A | 4/2014 | |
| CN | 104270470 | A * | 1/2015 | |
| CN | 104270470 | A | 1/2015 | |
| CN | 105183675 | A | 12/2015 | |
| EP | 1049012 | A2 * | 11/2000 | G06F 9/544 |
| EP | 1049012 | A2 | 11/2000 | |
| EP | 3104271 | A1 * | 12/2016 | G06F 9/45504 |
| WO | 2015062339 | A1 | 5/2015 | |
| WO | WO-2015062339 | A1 * | 5/2015 | G06F 9/4843 |

OTHER PUBLICATIONS

Liao, X., et al., "Sharing Virtual USB Device in Virtualized Desktop," XP032094110, Fourth International Symposium on Parallel Architectures, Algorithms and Programming, Dec. 9, 2011, pp. 156-160.
Foreign Communication From a Counterpart Application, European Application No. 16894198.7, Extended European Search Report dated Feb. 14, 2019, 9 pages.
Machine Translation and Abstract of Chinese Publication No. CN102521027, Jun. 27, 2012, 7 pages.
Machine Translation and Abstract of Chinese Publication No. CN102722678, Oct. 10, 2012, 6 pages.
Machine Translation and Abstract of Chinese Publication No. CN103473113, Dec. 25, 2013, 10 pages.
Machine Translation and Abstract of Chinese Publication No. CN104270470, Jan. 7, 2015, 16 pages.
Foreign Communication From a Counterpart Application, PCT Application No. PCT/CN2016/105955, English Translation of International Search Report dated Feb. 14, 2017, 2 pages.
Foreign Communication From a Counterpart Application, PCT Application No. PCT/CN2016/105955, English Translation of Written Opinion dated Feb. 14, 2017, 6 pages.
Sun, Y., "Research on USB Device Redirection Technology in Cloud Desktop," Apr. 14, 2015, 8 pages.

* cited by examiner

REDIRECTION METHOD AND APPARATUS, AND SYSTEM

CROSS-REFERENCE TO RELATED APPLICATIONS

This application is a continuation of International Patent Application No. PCT/CN2016/105955 filed on Nov. 15, 2016, which claims priority to Chinese Patent Application No. 201610158900.8 filed on Mar. 17, 2016. The disclosures of the aforementioned applications are hereby incorporated by reference in their entireties.

TECHNICAL FIELD

This application relates to the virtual machine field, and in particular, to a method and an apparatus used for redirection for a human interface device (HID) in a virtual desktop infrastructure (VDI) scenario, and a system.

BACKGROUND

A virtual desktop technology is currently a popular technology used in an enterprise office environment. According to the technology, execution of computation and operations is hosted by a server. A client device implements only desktop display and user operation event (such as a keyboard or mouse event) capturing. A memory resource and a central processing unit (CPU) can be scheduled as required using a management system of the server. This effectively improves efficiency in using the memory resource and the CPU. In addition, because the client device merely implements display and user operation event capturing, a user can log in to a same virtual machine of the server from any client device, effectively using the virtual machine at any place and greatly improving convenience of use.

During use of the virtual desktop technology, an HID is used in a large quantity of scenarios, such as an HID reading operation. Because the HID is connected to the client device and a virtual machine that initiates a request for operating the HID runs on the server, the HID operation request generated on the server needs to be redirected to the client device. In a process of redirection for the HID, the request for operating the HID and data read from the HID need to be transferred between the client device and the server. In other approaches, a method used in a process of transferring, by the server, the HID operation request to the client device is sensitive to a delay of a communications network between the server and the client device, lowering reliability of the HID during use.

SUMMARY

This application provides a redirection method and apparatus, and a system to improve reliability of redirection for an HID.

According to a first aspect of this application, a redirection method is provided. The method is used for redirection for an HID in a VDI, the VDI includes a server and a client device, the client device is connected to the HID, and a virtual machine runs on the server. The redirection method includes obtaining, by the virtual machine, an interface invocation request, where the interface invocation request includes an interface name and an interface parameter, performing, by the virtual machine, a serialization operation on the interface parameter to obtain a serialization result, generating, by the virtual machine, a data packet, and sending the data packet to the client device using a communications network, where the data packet includes the interface name and the serialization result, receiving, by the client device, the data packet to obtain the serialization result and the interface name, and performing a deserialization operation on the serialization result to obtain the interface parameter, and accessing, by the client device, the HID based on the interface parameter and the interface name to obtain information about the HID, and sending the information about the HID to the virtual machine.

The client device obtains the interface parameter and the interface name, and reconstructs the interface invocation request obtained by the virtual machine. An interface invocation request generated by the virtual machine running on the server is redirected to the client device, and the client device obtains the information about the HID based on the interface invocation request and sends the information about the HID to the virtual machine. The virtual machine returns the information about the HID to the application program. According to the method for redirection for an HID implemented in this application, stability of the HID is improved during use.

In a possible implementation, performing, by the virtual machine, a serialization operation on the interface parameter to obtain a serialization result includes obtaining, by the virtual machine, based on a parameter type of the interface parameter, bottom layer data corresponding to the interface parameter, and performing, by the client device, a deserialization operation on the serialization result to obtain the interface parameter includes obtaining, by the client device, the interface parameter based on the bottom layer data corresponding to the interface parameter.

After obtaining the interface name, the client device can obtain a parameter type of an input parameter corresponding to the interface name. In this case, the parameter type of the interface parameter corresponding to the bottom layer data is obtained, and therefore the interface parameter can be reconstructed based on the bottom layer data.

The interface parameter may be formed by nesting a plurality of types of data structures and the bottom layer data corresponding to the interface parameter is stored in a storage device in the server. Therefore, in order to redirect the interface invocation request to the client device, the bottom layer data corresponding to the interface parameter needs to be sent from the server to the client device such that the client device can reconstruct the interface parameter based on the bottom layer data to implement a process of redirection for an HID.

According to a second aspect of this application, a redirection apparatus is provided. The apparatus is used for redirection for an HID in a VDI, the VDI includes a server and a client device, and the client device is connected to the HID. The apparatus includes a receiving module configured to receive an interface invocation request sent by an application program running on the server, where the interface invocation request indicates obtaining information about the HID and includes an interface name and an interface parameter, a serialization module configured to perform a serialization operation on the interface parameter to obtain a serialization result, and a communications module configured to encapsulate the interface name and the serialization result into a data packet and send the data packet to the client device using a communications network.

After obtaining the data packet, the communications module sends the data packet to the communications network. The data packet carries address information of a destination client device such that the communications network can route the data packet to the destination client device.

The redirection apparatus is further configured to return, to the application program, the information about the HID that is obtained after the client device accesses the HID.

The redirection apparatus belongs to the server, and is an apparatus used for redirection for the HID in the server. The receiving module of the apparatus is capable of capturing an interface invocation request that is sent by an operating system used by a virtual machine running on the server.

The redirection apparatus encapsulates the interface invocation request into the data packet and sends the data packet to the client device. This avoids a pressure on a communications network caused when a plurality of instructions converted from the interface invocation request on the server are transmitted to the client device, and avoids impact of insufficient performance of the communications network on a process of redirection for an HID.

In a possible implementation, the serialization module is further configured to obtain, based on a parameter type of the interface parameter, bottom layer data corresponding to the interface parameter.

According to a third aspect of this application, a redirection apparatus is provided. The apparatus is used for redirection for an HID in a VDI, the VDI includes a server and a client device, and the client device is connected to the HID. The apparatus includes a communications module configured to receive a data packet, and send a serialization result and an interface name that are included in the data packet to a deserialization module, and the deserialization module configured to obtain the serialization result and the interface name from the data packet, and perform a deserialization operation on the serialization result to obtain an interface parameter.

The communications module is further configured to access the HID based on the interface parameter and the interface name to obtain information about the HID, and send the information about the HID to a virtual machine.

After obtaining the information about the HID, the communications module encapsulates the information about the HID into a data packet and sends the data packet to a communications network. The data packet carries address information of a destination server of the data packet that carries the serialization result and the interface name such that the communications network can route the data packet to the destination server.

The redirection apparatus belongs to the client device, and is an apparatus used for redirection for the HID in the client device. The communications module in the redirection apparatus is capable of communicating with the communications network and the HID. In a possible implementation, that the deserialization module performs a deserialization operation on the serialization result to obtain an interface parameter further includes obtaining the interface parameter based on bottom layer data corresponding to the interface parameter.

According to a fourth aspect of this application, a server is provided. The server includes a processor and a memory. The memory is configured to store an instruction, and the processor is configured to execute the instruction to execute a method, performed by a virtual machine side, in the redirection methods provided in the first aspect of this application and any one of the implementations of the first aspect of this application.

According to a fifth aspect of this application, a client device is provided. The client device includes a processor and a memory. The memory is configured to store an instruction, and the processor is configured to execute the instruction to execute a method, performed by a client device side, in the redirection methods provided in the first aspect of this application and any one of the implementations of the first aspect of this application.

According to a sixth aspect of this application, a VDI is provided. The VDI includes at least one server provided in the fourth aspect and at least one client device provided in the fifth aspect. The server and the client device communicate with each other using a communications network.

According to a seventh aspect of this application, a storage medium is provided. The storage medium stores program code. The program code, when run by a computing device, executes the redirection method provided in the first aspect or any one of the implementations of the first aspect. The storage medium includes but is not limited to a flash memory, a hard disk drive (HDD), or a solid state drive (SSD).

In the technical solutions provided in this application, an interface invocation request that is for an HID and that is obtained by a virtual machine running on a server is sent to a client device after a serialization operation, and the client device parses the interface invocation request into a plurality of instructions that can be executed by the HID, and accesses the HID based on the plurality of instructions. This avoids a communication efficiency decrease caused when the server sends to the client device a plurality of instructions generated after parsing the interface invocation request, and avoids a reliability decrease caused by very high sensitivity to a communications network delay.

DESCRIPTION OF EMBODIMENTS

The following clearly describes the technical solutions in the embodiments of this application with reference to the accompanying drawings in the embodiments of this application.

Figure 1:
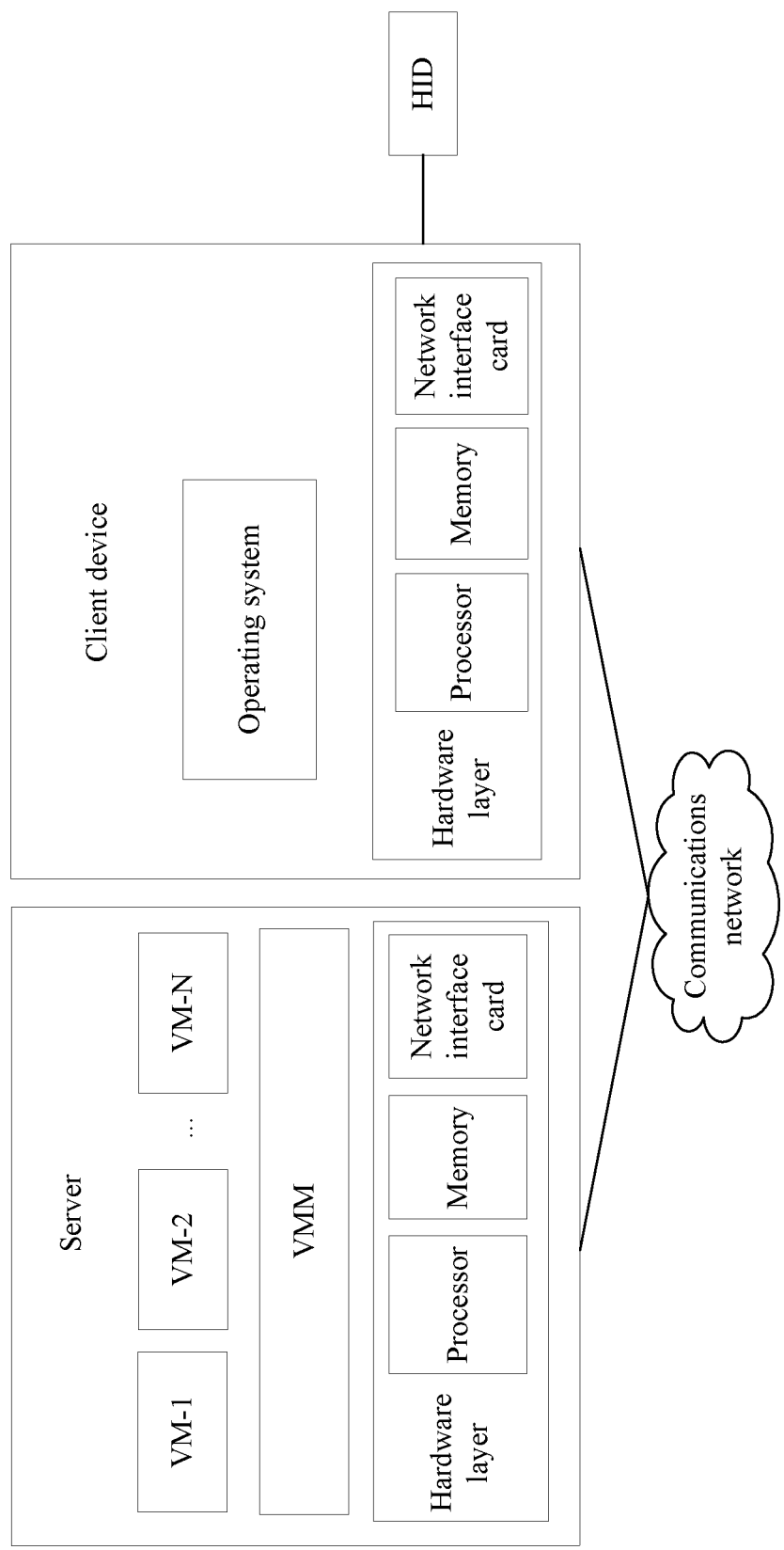
FIG. 1 is a schematic diagram of a VDI according to this application.

FIG. 1 is a schematic diagram of a VDI applied in an embodiment of this application. The VDI includes a server and a client device.

The server includes a hardware layer, that is, a hardware platform on which a virtualization environment runs. The hardware layer may include a plurality of types of hardware, such as a processor (such as a CPU), a memory, and a storage device (which may include a hard disk and/or a memory), and may further include a device such as a network interface card.

A virtual machine (also referred to as VM) and a virtual machine monitor (VMM) run on the server. One or more VMs can be simulated on one server using virtual machine software. These VMs work just like real computers. An operating system and an application program can be installed on the VM, and the VM can access a network resource. The application program running on the VM works as if it works in a real computer. The VMM is used to manage and allocate the hardware layer, present a virtual hardware platform for the VM, and implement scheduling and isolation of the VM. The virtual hardware platform provides the VMs running on the virtual hardware platform with various hardware resources, such as a virtual CPU, a memory, a virtual disk, and a virtual network interface card.

The client device includes a hardware layer that is similar to the hardware layer of the server. An operating system runs on the hardware layer of the client device. The operating system may be a tailored version of the operating system running on the VM of the server. In a scenario of this application, the operating system running on the client device has a function of converting an interface invocation request into an instruction that can be identified by an HID. The client device is also referred to as a thin client. The client device can be connected to one or more HIDs.

One server may correspond to one or more client devices. One or more virtual machines, namely, VM-1 to VM-N, run on the server. The client device is connected to the HID. During running of a VM, an application program running on the VM generates an interface invocation request that is used to obtain information about the HID, convert, according to a pre-designed protocol or standard, the interface invocation request into an instruction that can be identified by the HID, and send a converted instruction to the HID. The HID executes the converted instruction to implement an operation indicated by the interface invocation request. Because a common HID is connected to the client device using a Universal Serial Bus (USB) interface, the pre-designed protocol or standard also needs to comply with the USB protocol. In a conventional process of redirection for the HID, a VM running on the server performs the foregoing conversion action and then sends, to the client device, a plurality of instructions that are generated after the conversion and that comply with the USB protocol, and the client device receives and executes these instructions to implement an operation on the HID. In this process, because these instructions involve a large amount of data and there is a strict requirement on a delay in returning data by the client device, an existing redirection method is very sensitive to a network delay, causing insufficient reliability of the HID during use.

Throughout this specification, the HID includes various devices that interact with a user, such as a keyboard, a mouse, a joystick, a printer, and a card reader.

Throughout this specification, the information about the HID includes one or more of device information of the HID and user information obtained by the HID. The device information of the HID is hardware information of the HID itself. For example, the device information of the HID is one or more of a product identifier (also referred to as ID) and a vendor ID. The user information obtained by the HID includes information that is sent by a user to the HID and obtained by the HID. For example, the user information obtained by the HID is information about an operation on the HID when the HID is a device such as a keyboard, a printer, or a mouse. The user information obtained by the HID further includes information that is transmitted to the HID by another storage medium installed by the user on the HID. For example, when the HID is a card reader, the device information of the HID is device information of the card reader itself, and the user information obtained by the HID is information carried in a storage card that is installed on the card reader.

Throughout this specification, a setup interface is an operating system interface used to obtain the device information of the HID. Using a WINDOWS operating system running on the VM as an example, the setup interface includes but is not limited to SetupDiGetClassDevsA, SetupDiEnumDeviceInterfaces, SetupDiGetDeviceInterfaceDetailA, or SetupDiDestroyDeviceInfoList.

Throughout this specification, an HID interface is an operating system interface used to obtain the user information obtained by the HID. Using a WINDOWS operating system running on the VM as an example, the setup interface includes but is not limited to HidD_GetHidGuid, HidD_GetProductString, HidD_GetManufacturerString, HidD_GetPreparsedData, HidP_GetCap, HidD_FreePreparsedData, HidD_GetAttribute, or HidD_GetHidGui.

Figure 2:
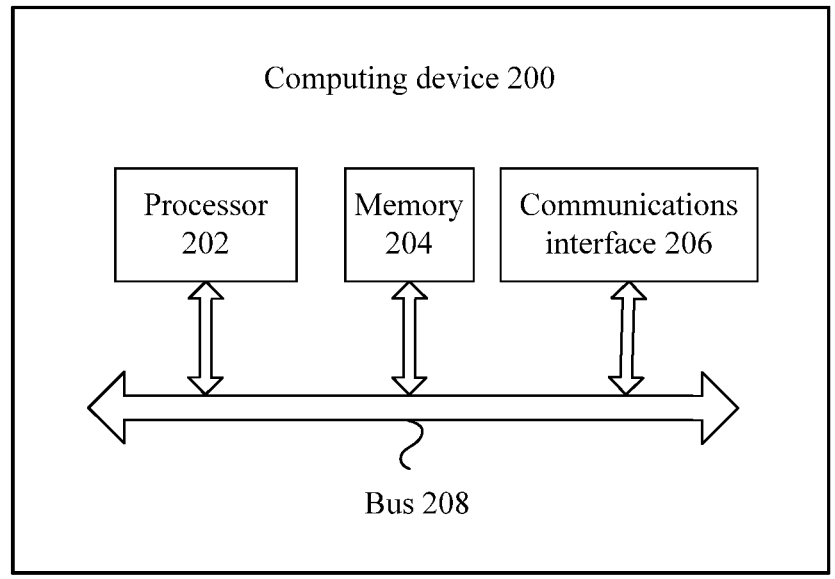
FIG. 2 is a schematic structural diagram of an embodiment of a computing device according to this application.

The server shown in FIG. 1 may be implemented using a computing device 200 shown in FIG. 2. FIG. 2 shows a schematic structural diagram of the computing device 200, which includes a processor 202 and a memory 204, and may further include a bus 208 and a communications interface 206.

Communication connections between the processor 202, the memory 204, and the communications interface 206 may be implemented using the bus 208 or using another means such as wireless transmission.

The memory 204 may include a volatile memory, such as a random-access memory (RAM). The memory 204 may also include a non-volatile memory, such as a read-only memory (ROM), a flash memory, an HDD, or an SSD. The memory 204 may further include a combination of the foregoing types of memories. When the technical solutions provided in this application are implemented using software, partial program code executed by a server side for a redirection method provided in FIG. 4 in this application is stored in the memory 204, and executed by the processor 202.

The computing device 200 communicates with a client device using the communications interface 206.

The processor 202 may be a CPU.

During running, the processor 202 performs the following operations of receiving an interface invocation request sent by an application program, where the interface invocation request includes an interface parameter and an interface name, performing a serialization operation on the interface parameter to obtain a serialization result, and encapsulating the interface name and the serialization result into a data packet, and sending the data packet to the client device using the communications interface 206.

After the communications interface 206 obtains information about the HID obtained when the client device accesses the HID based on the interface invocation request, the processor 202 is further configured to return the information about the HID to the application program.

Figure 3:
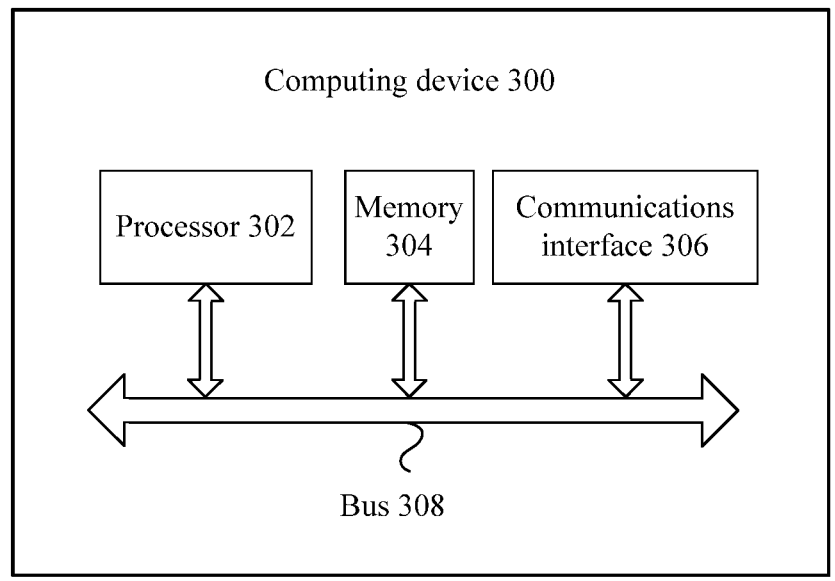
FIG. 3 is a schematic structural diagram of another embodiment of a computing device according to this application.

The client device shown in FIG. 1 may be implemented using a computing device 300 shown in FIG. 3. FIG. 3 shows a schematic structural diagram of the computing device 300, which includes a processor 302 and a memory 304, and may further include a bus 308 and a communications interface 306.

Communication connections between the processor 302, the memory 304, and the communications interface 306 may be implemented using the bus 308 or using other means such as wireless transmission.

The processor 302 may be a CPU. The memory 304 may include a volatile memory, such as a RAM. The memory 304 may also include a non-volatile memory, such as a ROM, a flash memory, an HDD, or an SSD. The memory 304 may further include a combination of the foregoing types of memories. When the technical solutions provided in this application are implemented using software, partial program code executed by a client device side for a redirection method provided in FIG. 4 in this application is stored in the memory 304, and executed by the processor 302. The computing device 300 communicates with a server using the communications interface 306.

After receiving a data packet sent from the server, the communications interface 306 obtains a serialization result and an interface name that are included in the data packet, and sends the serialization result and the interface name to the processor 302.

During running, the processor 302 performs the following operations of obtaining the serialization result and the interface name from the data packet, and performing a deserialization operation on the serialization result to obtain an interface parameter, accessing an HID based on the interface parameter and the interface name to obtain the information about the HID, and sending, using the communications interface 306, the information about the HID to the server that has sent the data packet carrying the serialization result.

Figure 4:
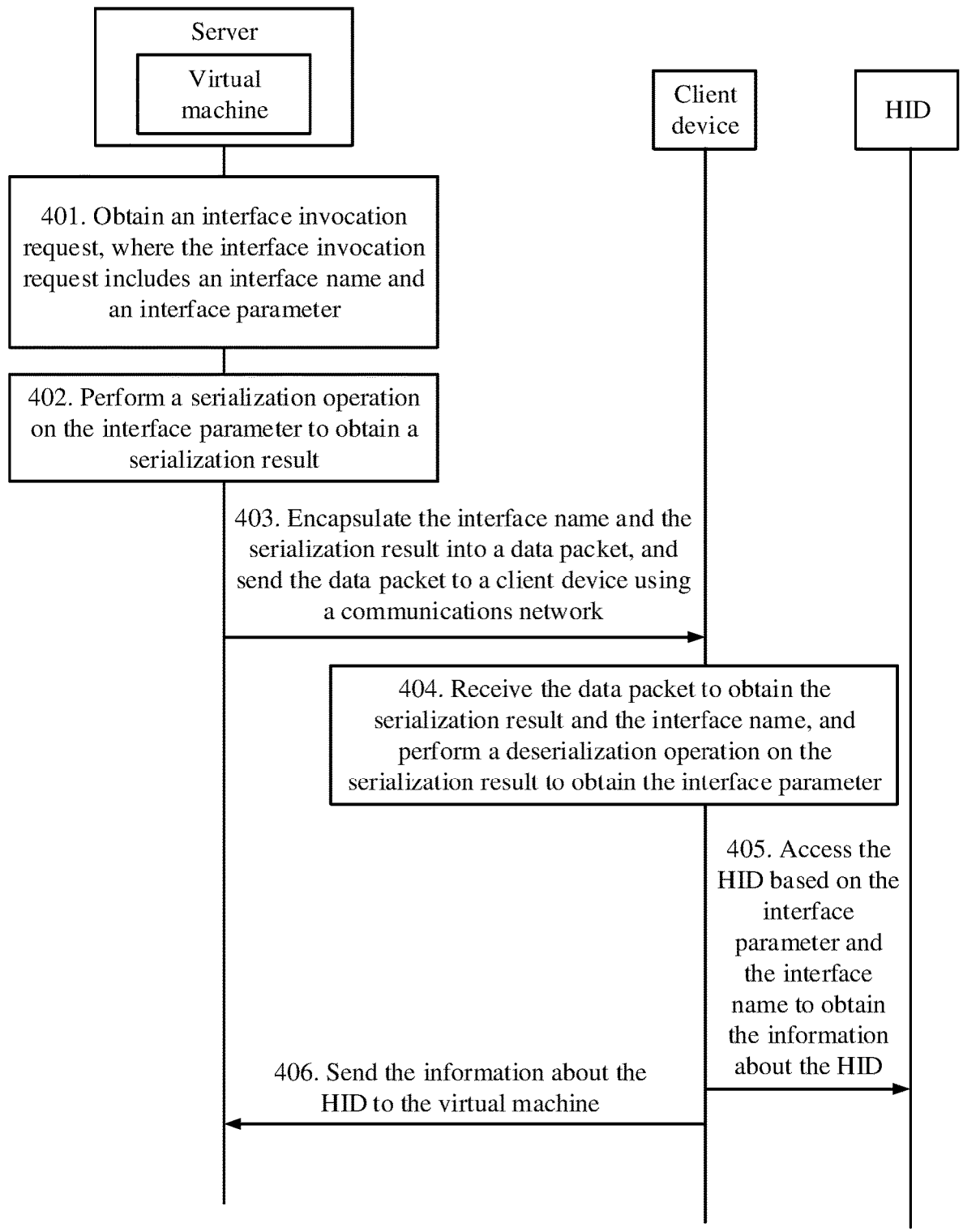
FIG. 4 is a schematic flowchart of an embodiment of a redirection method according to this application.

Based on the VDI shown in FIG. 1, this application provides a redirection method. When running, the server and the client device shown in FIG. 1 execute the method. FIG. 4 shows a schematic flowchart of the method.

Step 401. A virtual machine obtains an interface invocation request, where the interface invocation request includes an interface name and an interface parameter.

The interface invocation request indicates obtaining information about an HID. When performing an operation on the HID, an application program running on the virtual machine invokes a corresponding interface invocation request, and the virtual machine captures the interface invocation request. The interface invocation request sent by the application program may be captured using a hook module.

Optionally, the interface name is a setup interface, and the information about the HID is device information of the HID.

Optionally, the interface is an HID interface, and the information about the HID is user information obtained by the HID.

Step 402. The virtual machine performs a serialization operation on the interface parameter to obtain a serialization result.

Optionally, performing, by the virtual machine, a serialization operation on the interface parameter to obtain a serialization result further includes obtaining, by the virtual machine, based on a parameter type of the interface parameter, bottom layer data corresponding to the interface parameter.

Step 403. The virtual machine encapsulates the interface name and the serialization result into a data packet, and sends the data packet to the client device using a communications network.

Step 404. The client device receives the data packet to obtain the serialization result and the interface name, and performs a deserialization operation on the serialization result to obtain the interface parameter.

Optionally, performing, by the client device, a deserialization operation on the serialization operation to obtain the interface parameter includes obtaining, by the client device, the interface parameter based on the bottom layer data corresponding to the interface parameter.

It should be noted that the interface parameter may be of various data structures or data types, such as a variable type (such as a numerical value or an enumerated value type), an indirect access type (such as a pointer or a pointer of a pointer), or a handle. Different types of interface parameters can be used as interface parameters of different interface invocation requests. For example, in WINDOWS, interface parameters of an interface invocation request with the interface name HidD_GetPreparsedData are HidDeviceObject and *PreparsedData.

In a serialization operation process, because the interface parameter needs to be converted into a byte sequence so as to transmit the interface parameter using the communications network, a byte sequence corresponding to the bottom layer data corresponding to the interface parameter needs to be obtained. For example, an interface parameter to be processed is a pointer A, and a variable B to which the pointer A points needs to be obtained in the serialization operation process. In this case, the variable B is bottom layer data of the pointer A. For example, an interface parameter to be processed is a pointer C of a pointer, a pointer D to which the pointer C of the pointer points needs to be obtained, and then a variable E to which the pointer D points needs to be obtained. In this case, the variable E is bottom layer data of the pointer C of the pointer. Although bottom layer data of different types may be obtained in processes of serialization operations on different interface parameters, an original interface parameter can be restored based on bottom layer data of the original interface parameter. For example, if the original interface parameter is a handle, the handle can be obtained through a deserialization operation on the bottom layer data of the original interface parameter. In practice, there may be more types of the interface parameter to be processed, for example, multiple levels of pointer nesting or multiple levels of handle nesting. The bottom layer data corresponding to the interface parameter of the interface invocation request sent by the VM usually indicates a continuous segment of memory values in storage space of the server.

A deserialization operation process includes reconstructing, based on the bottom layer data, the interface parameter corresponding to the bottom layer data. For example, the bottom layer data includes a variable B, a pointer A' is reconstructed, and the pointer A' points to the variable B. After obtaining the interface name, the client device can obtain, based on the interface name, a type of an input parameter corresponding to the interface name. For example, in WINDOWS, the interface parameters of the interface invocation request with the interface name HidD_GetPreparsedData include *PreparsedData. Therefore, after obtaining a data packet that includes the interface name HidD_GetPreparsedData, the client device can learn that an input parameter corresponding to the interface name includes a pointer. Therefore, the client device reconstructs, based on bottom layer data carried in the data packet, a pointer as the input parameter of the interface HidD_GetPreparsedData.

The serialization operation and the deserialization operation are usually used to transfer data between different devices using a communications network. For example, a process of redirection for an HID is implemented in the VDI shown in FIG. 1. In a process in which a VM running on the server runs an application program, the application program initiates an interface invocation request. The interface invocation request includes an interface name of an interface needing to be invoked by the application program and an interface parameter of the interface. The server needs to perform a serialization operation on the interface invocation request such that the interface invocation request can be transmitted to the client device using a data packet, and the client device can reconstruct the interface invocation request based on the data packet sent from the server. Therefore, an operation request, initiated by the VM of the server, for an HID can be redirected to the client device.

Step 405. The client device accesses the HID based on the interface parameter and the interface name to obtain information about the HID.

Step 406. The client device sends the information about the HID to the virtual machine.

The client device reconstructs, based on the obtained interface parameter and interface name, the interface invocation request. The operating system running on the client device converts the interface invocation request into a plurality of instructions that can be executed by the HID, and accesses the HID using these instructions to obtain the information about the HID.

After obtaining the information about the HID, the server returns the information about the HID to the application program that has sent the interface invocation request.

In the method for redirection for an HID provided in this application, the serialization result and the interface name that correspond to the interface parameter obtained by the server are sent to the client device using the data packet, and then the client device reconstructs the interface invocation request and accesses the HID. This avoids a reliability decrease caused when a plurality of instructions converted from the interface invocation request need to be transmitted in a communications network in the other approaches. The method for redirection for an HID provided in this application has a low requirement on a network delay and provides high stability.

Figure 5A:
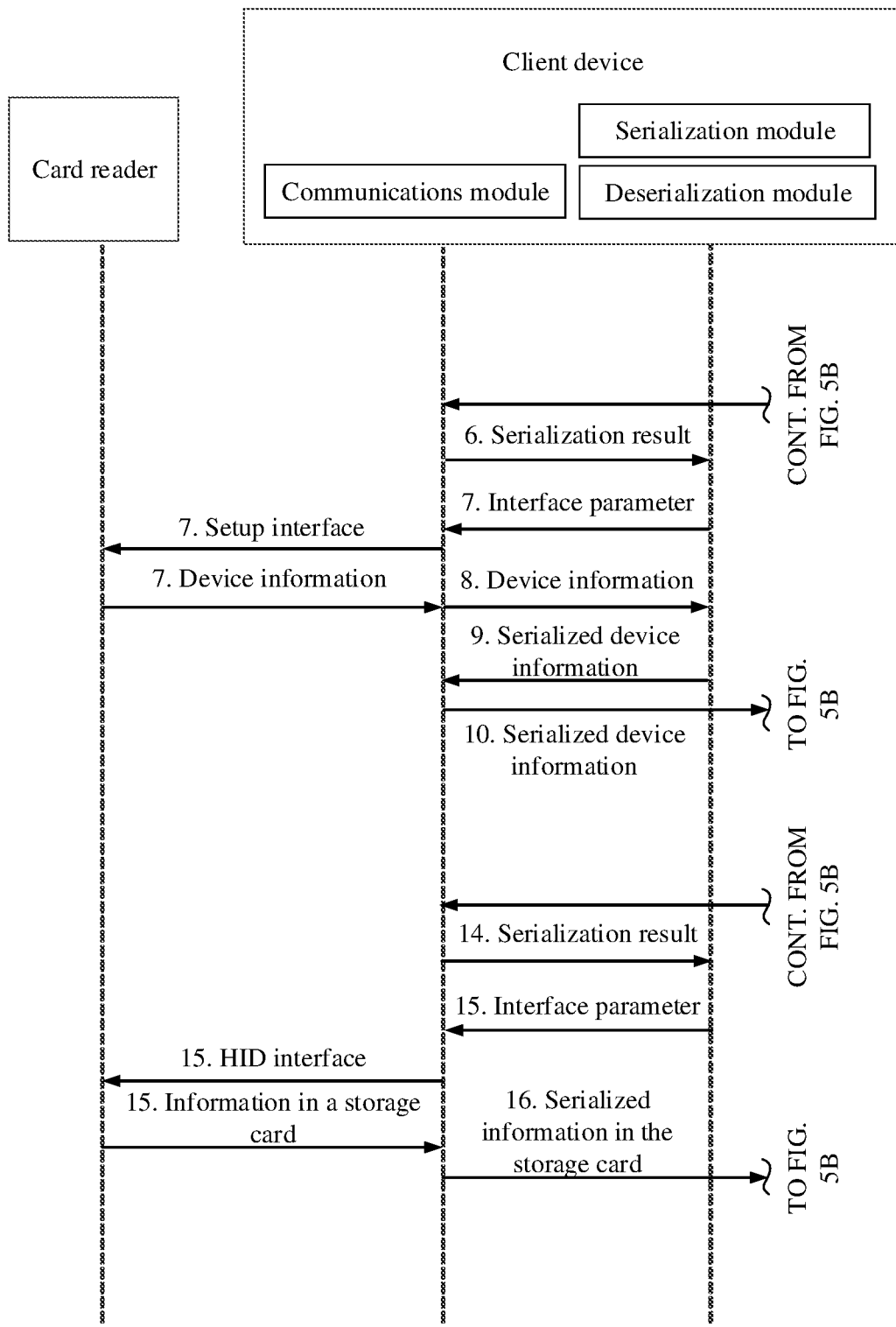
FIG. 5A and FIG. 5B are a schematic flowchart of a redirection method in an application scenario according to this application.
Figure 5B:
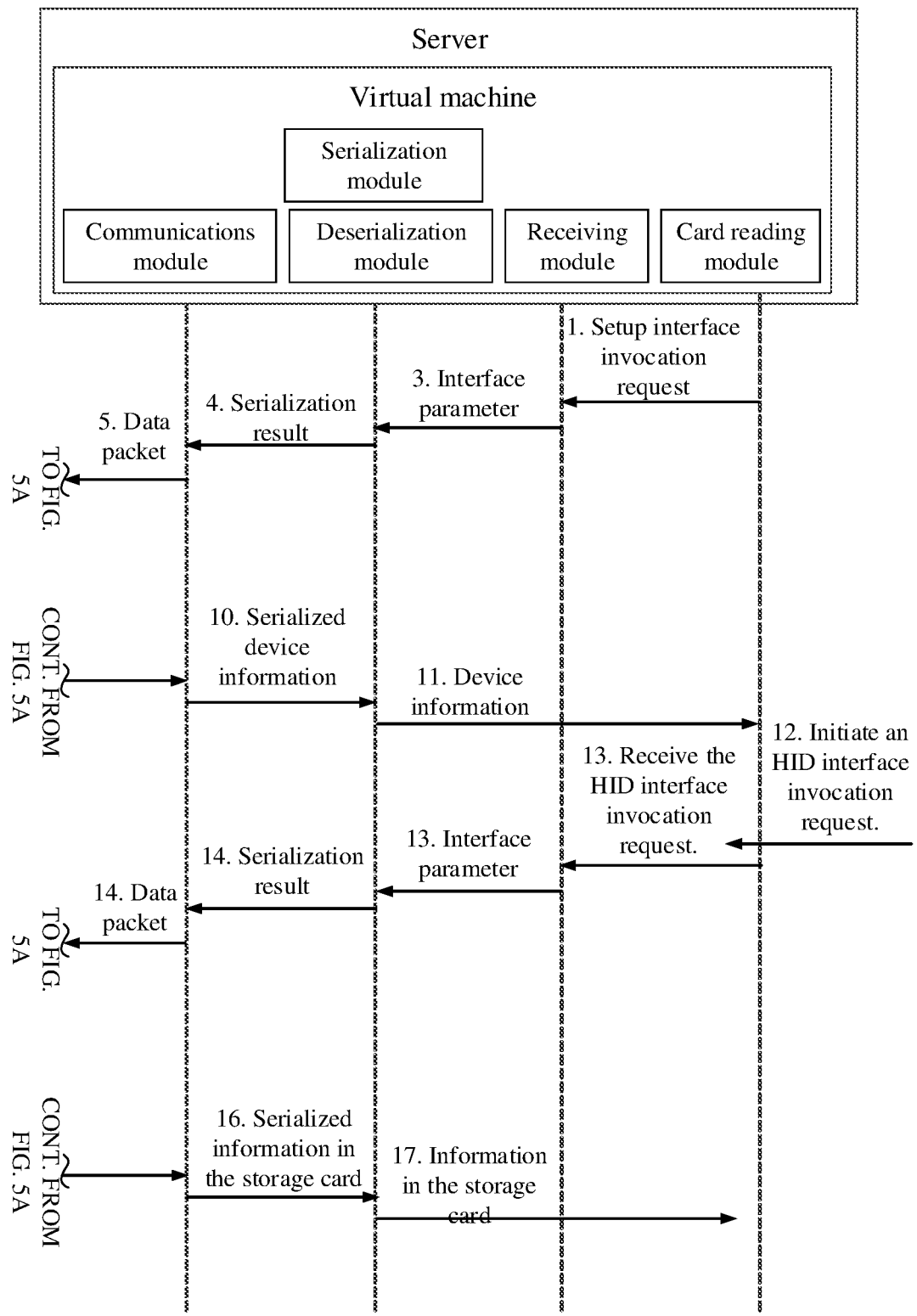

The following describes the redirection method provided in this application using specific examples. As shown in FIG. 5A and FIG. 5B, for example, a card reading module in a virtual machine running on a server performs a card reading operation. The method is implemented based on a system shown in FIG. 5A and FIG. 5B. The system includes a card reader, a client device, and a server. The client device includes a serialization module, a communications module, and a deserialization module. A virtual machine runs on the server, and the virtual machine includes a serialization module, a communications module, a deserialization module, a card reading module, and a receiving module. The method includes the following steps.

Step 1: The card reading module initiates an invocation request for a setup interface to an operating system, where the request is used to read device information of the card reader.

Step 2: The receiving module receives the invocation request, sent by the card reading module, for the setup interface.

Optionally, the receiving module may be a hook module.

Step 3: The receiving module transfers an interface parameter of the setup interface to the serialization module of the server for processing.

Step 4: After performing serialization on the interface parameter of the setup interface, the serialization module of the server sends an interface name and a serialization result of the interface parameter of the setup interface to the communications module of the server.

Step 5: The communications module of the server encapsulates the interface name and the serialization result of the interface parameter of the setup interface into a data packet, and sends the data packet to the client device.

Step 6: The communications module of the client device forwards the serialization result to the deserialization module of the client device to perform deserialization on the serialization result of the interface parameter of the setup interface.

Step 7: The communications module of the client device executes, based on the interface name and the interface parameter of the setup interface that is obtained through deserialization, the invocation request for the setup interface using an operating system running on the client device to read the device information of the card reader.

Step 8: The communications module of the client device sends the device information of the card reader to the serialization module of the client.

Step 9: After performing serialization on the device information of the card reader, the serialization module of the client device sends serialized device information of the card reader to the communications module of the client device.

Step 10: The communications module of the client device sends the serialized device information of the card reader to the server.

Step 11: After processing the serialized device information of the card reader, the deserialization module of the server obtains the device information of the card reader and returns the device information of the card reader to the card reading module.

Step 12: The card reading module initiates invocation request for an HID interface to read information in a storage card on the card reader.

Step 13: The receiving module receives the invocation request, sent by the card reading module, for the HID interface, and transfers an interface parameter of the HID interface to the serialization module of the server for processing.

Step 14: After performing a serialization operation on the interface parameter of the HID interface, the serialization module of the server obtains a serialization result of the interface parameter of the HID interface, encapsulates an interface name of the HID interface and the serialization result of the interface parameter of the HID interface into a data packet, and then sends the data packet to the client device. The deserialization module of the client device performs a deserialization operation on the received serialization result of the interface parameter of the HID interface.

Step 15: The communications module of the client device reads, based on the obtained interface name of the HID interface and the interface parameter of the HID interface obtained through deserialization, the information in the storage card. After the obtained information in the storage card is processed by the serialization module of the client device, serialized information in the storage card is obtained and sent to the server using the communications module of the client device.

Step 16: After performing deserialization on the serialized information in the storage card, the deserialization module of the server returns the information in the storage card to the card reading module running on the virtual machine.

Step 17: The card reading module obtains the information in the storage card.

In practice, the serialization module and deserialization module of the server may be a same module for implementing serialization and deserialization functions. This is similar to the serialization module and deserialization module of the client device. The serialization module of the server has a function similar to that of the serialization module of the client device, and the deserialization module of the server has a function similar to that of the deserialization module of the client device.

Figure 6A:
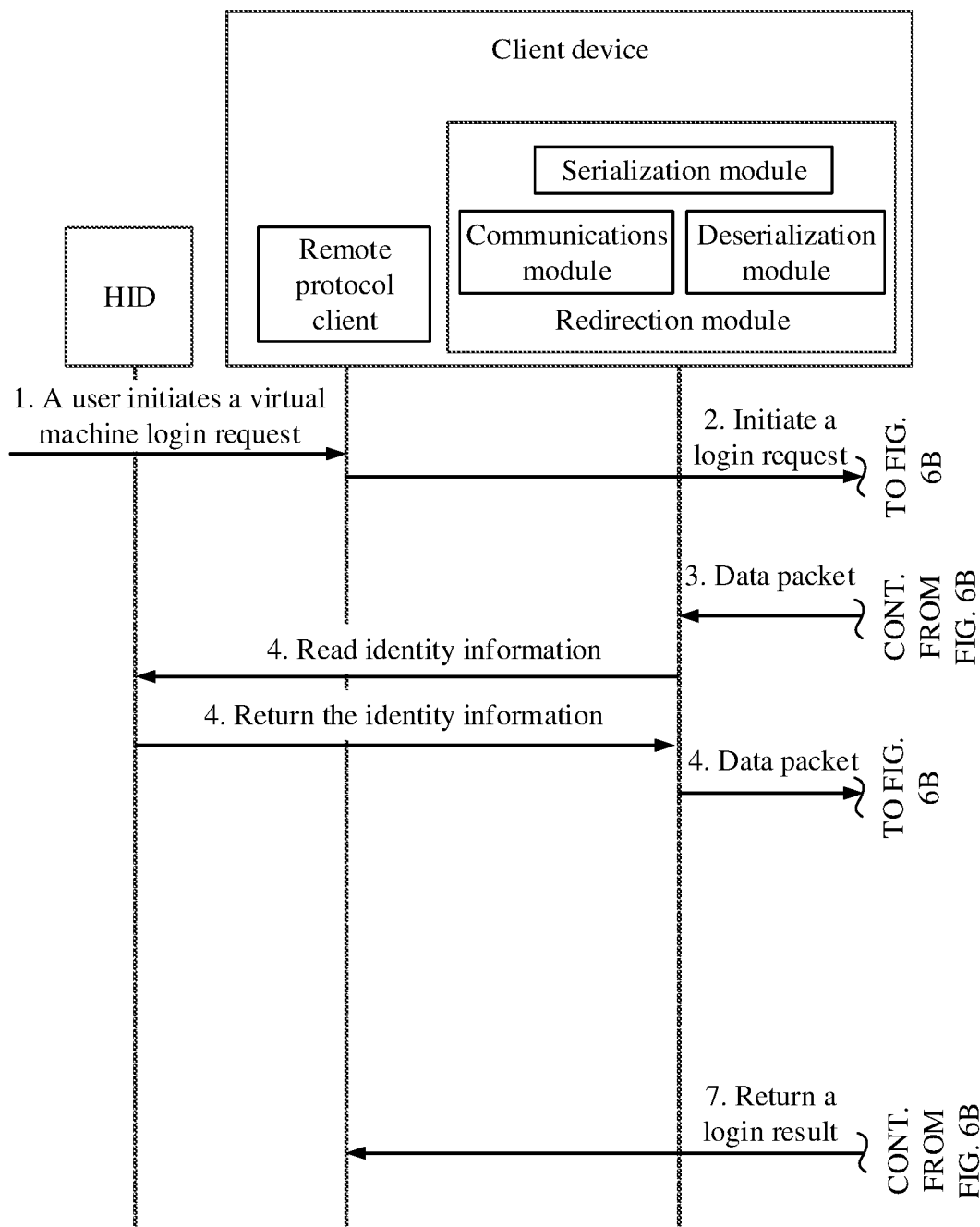
FIG. 6A and FIG. 6B are a schematic flowchart of a redirection method in another application scenario according to this application.
Figure 6B:
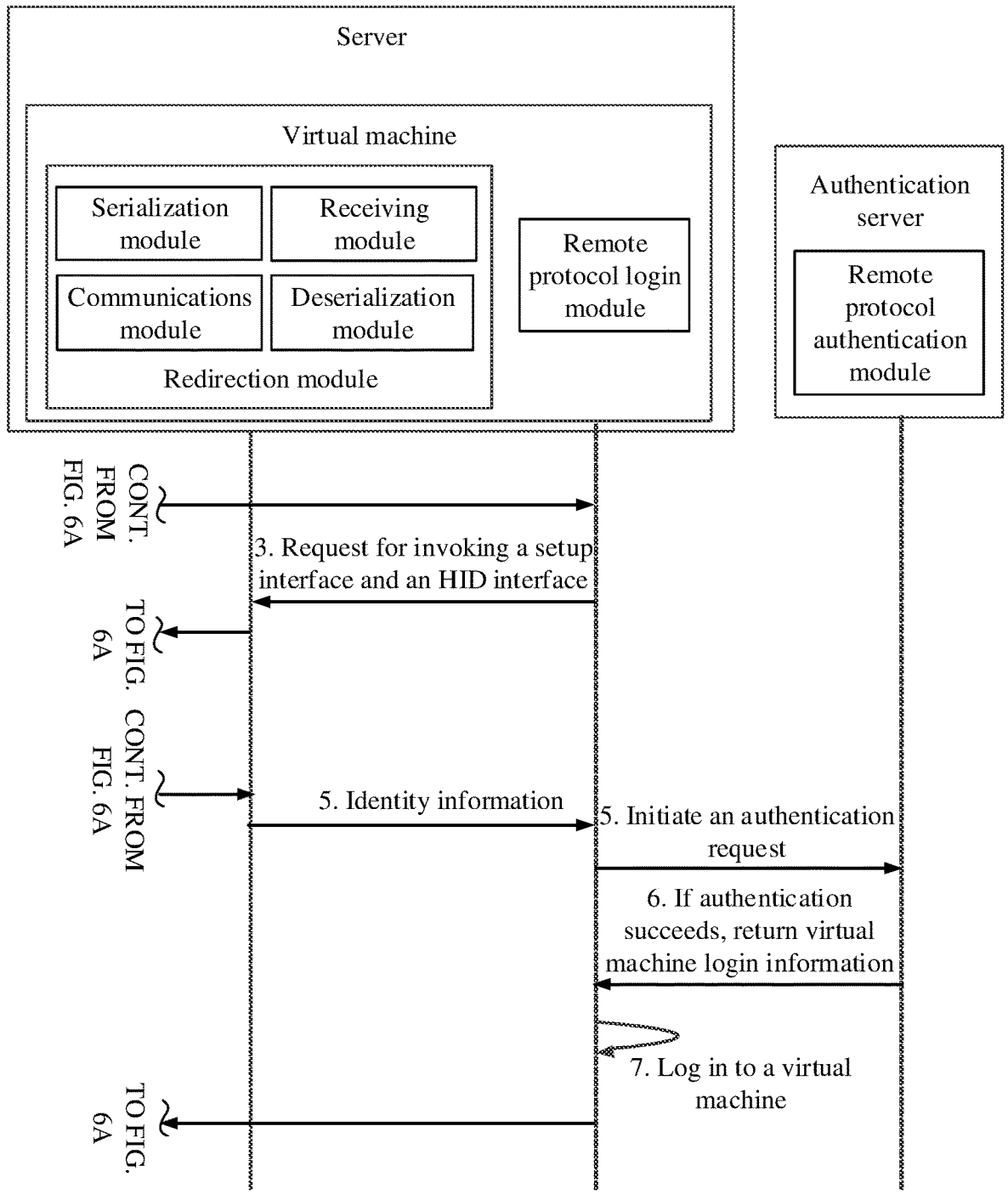

As shown in FIG. 6A and FIG. 6B, the redirection method provided in this application is described using an example of an application scenario in which a user performs identity authentication on virtual machine login using identity information. The method is implemented based on a system shown in FIG. 6A and FIG. 6B. The system includes an HID, a client device, a server, and an authentication server. The client device includes a redirection module and a remote protocol client. The redirection module includes a serialization module, a communications module, and a deserialization module. A virtual machine runs on the server. The virtual machine includes a remote protocol login module and a redirection module. The redirection module includes a serialization module, a communications module, a deserialization module, and a receiving module. The authentication server includes a remote protocol authentication module, and may further include a communications module used for communication. The method includes the following steps.

Step 1: The user initiates a virtual machine login request to the server using the remote protocol client of the client device.

Step 2: The remote protocol login module of the server obtains the virtual machine login request.

Step 3: The server initiates a request for invoking a setup interface and an HID interface based on the virtual machine login request, and redirects the interface invocation request to the client device using the redirection module to read the user's identity information. A process of redirecting the interface invocation request is implemented based on the redirection method provided in the foregoing embodiment of this application.

The redirection module of the server includes a software module that implements the method on the server side provided in the embodiment shown in FIG. 4. For submodules of the redirection module, refer to the embodiment shown in FIG. 5A and FIG. 5B. The redirection module of the client device includes a software module that implements the method on the client device side provided in the embodiment shown in FIG. 4. For submodules of the redirection module, refer to the embodiment shown in FIG. 5A and FIG. 5B.

Step 4: The redirection module of the client device obtains the user's identity information, and returns the user's identity information to the server.

Step 5: The redirection module of the server obtains the user's identity information, and transfers the user's identity information to the remote protocol login module. The remote protocol login module initiates an authentication request to the authentication server based on the user's identity information.

Step 6: After obtaining the authentication request, the authentication server authenticates the user's identity information using the remote protocol authentication module. If the authentication succeeds, the authentication server returns virtual machine login information to the remote protocol login module.

Step 7: After obtaining the virtual machine login information, the remote protocol login module logs in to the virtual machine using the virtual machine login information and returns a login result to the client device.

The user may select different identity information (such as an account/password, a fingerprint, or a smart card) for identity authentication on virtual machine login. Before logging in to the virtual machine, the authentication on the user's identity information needs to succeed. The method provided above can provide more reliable redirection for an interface invocation request between a server and a virtual machine and can implement authentication on a user's identity information to improve user experience.

An embodiment of the present disclosure further provides a redirection apparatus 500. The apparatus 500 may be implemented using the computing device 200 shown in FIG. 2, an application-specific integrated circuit (ASIC), or a programmable logic device (PLD). The PLD may be a complex programmable logic device (CPLD), a field-programmable gate array (FPGA), a generic array logic (GAL), or any combination thereof. The redirection apparatus 500 is configured to implement the method performed by the server side in the redirection method shown in FIG. 4. When the redirection method shown in FIG. 4 is implemented using software, the redirection apparatus 500 and modules included in the redirection apparatus 500 may also be software modules.

Figure 7:
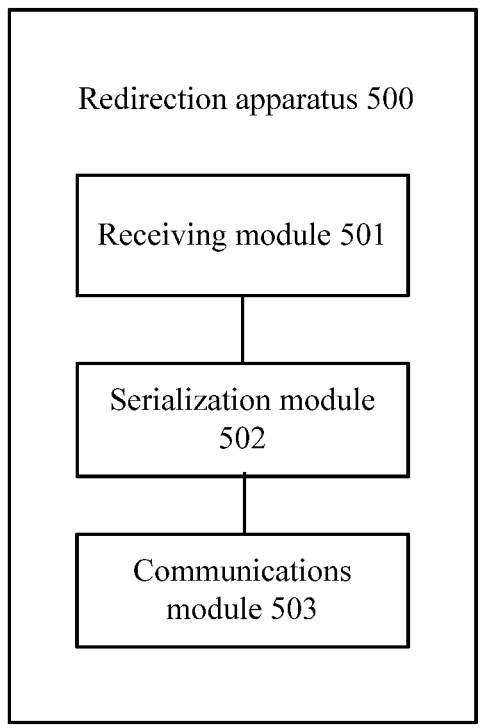
FIG. 7 is a schematic structural diagram of an embodiment of a redirection apparatus according to this application.

FIG. 7 shows a schematic structural diagram of the redirection apparatus 500, which includes a receiving module 501, a serialization module 502, and a communications module 503. When the receiving module 501 is working, step 401 of the redirection method shown in FIG. 4 is performed. When the serialization module 502 is working, step 402 of the redirection method shown in FIG. 4 is performed. When the communications module 503 is working, step 403 of the redirection method shown in FIG. 4 is performed.

An embodiment of the present disclosure further provides a redirection apparatus 600. The apparatus 600 may be implemented using the computing device 300 shown in FIG. 3, or using an ASIC or a PLD. The PLD may be a CPLD, an FPGA, a GAL, or any combination thereof. The redirection apparatus 600 is configured to implement the method, performed by the client device side, in the redirection method shown in FIG. 4. When the redirection method shown in FIG. 4 is implemented using software, the redirection apparatus 600 and modules included in the redirection apparatus 600 may also be software modules.

Figure 8:
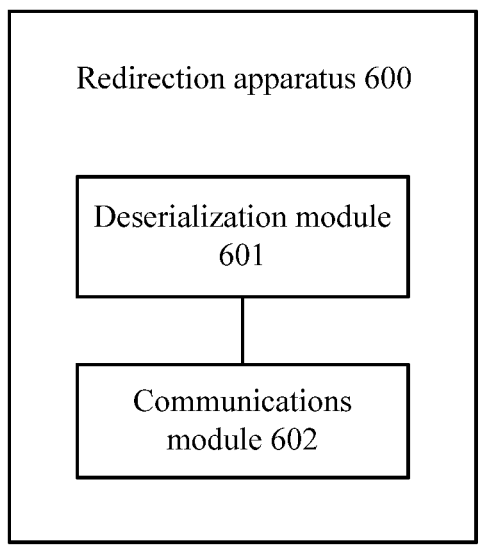
FIG. 8 is a schematic structural diagram of another embodiment of a redirection apparatus according to this application.

FIG. 8 shows a schematic structural diagram of the redirection apparatus 600, which includes a deserialization module 601 and a communications module 602. When the deserialization module 601 works, step 404 of the redirection method shown in FIG. 4 is performed. When the communications module 602 works, the action of receiving a data packet in step 404 and steps 405 and 406 of the redirection method shown in FIG. 4 are performed.

For related description of the foregoing apparatuses, refer to related descriptions and effects of the method embodiments for understanding. Details are not further described herein.

This application further provides a VDI. FIG. 1 shows a schematic structural diagram of the VDI. The VDI includes at least one server and at least one client device.

It may be clearly understood by persons skilled in the art that, for brevity and ease of description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A redirection method, applied to implement redirection for a human interface device (HID) in a virtual desktop infrastructure (VDI), comprising:
    obtaining, by a virtual machine running on a server, an interface invocation request, wherein the interface invocation request comprises an interface name and an interface parameter, and wherein the VDI comprises the server and a client device coupled to the HID;
    performing, by the virtual machine, a serialization operation on the interface parameter to obtain a serialization result;
    generating, by the virtual machine, a data packet;
    sending, by the virtual machine, the data packet to the client device using a communications network, wherein the data packet comprises the interface name and the serialization result;
    receiving, by the client device, the data packet to obtain the serialization result and the interface name;
    performing, by the client device, a deserialization operation on the serialization result to obtain the interface parameter;
    reconstructing, by the client device, the interface invocation request based on the interface parameter and the interface name to generate a reconstructed interface invocation request;
    accessing, by the client device, the HID based on the reconstructed interface invocation request; and
    sending, by the client device, information about the HID to the virtual machine.

2. The redirection method of claim 1, wherein performing the serialization operation on the interface parameter to obtain the serialization result comprises obtaining, by the virtual machine based on a parameter type of the interface parameter, bottom layer data corresponding to the interface parameter.

3. The redirection method of claim 2, wherein performing the deserialization operation on the serialization result to obtain the interface parameter comprises obtaining, by the client device, the interface parameter based on the bottom layer data corresponding to the interface parameter.

4. The redirection method of claim 1, wherein the interface name comprises a name of a setup interface, and wherein the information about the HID comprises device information of the HID.

5. The redirection method of claim 1, wherein the interface name comprises a name of an HID interface, and wherein the information about the HID comprises user information from the HID.

6. The redirection method of claim 1, wherein the information about the HID comprises a product identifier and a vendor identifier.

7. The redirection method of claim 1, further comprising:
    converting the interface parameter to a byte sequence; and
    transmitting the byte sequence to the virtual machine.

8. The redirection method of claim 1, wherein the interface parameter comprises a numerical value.

9. The redirection method of claim 1, wherein the interface parameter comprises an enumerated value type.

10. The redirection method of claim 1, wherein the interface parameter comprises an indirect access type.

11. The redirection method of claim 1, wherein the interface parameter comprises a pointer.

12. The redirection method of claim 1, wherein the interface parameter comprises a first pointer that points to a second pointer.

13. The redirection method of claim 1, further comprising converting the interface invocation request into a plurality of instructions that are executed by the HID.

14. The redirection method of claim 1, further comprising authenticating, by the virtual machine, the client device.

15. The redirection method of claim 1, wherein the HID comprises a universal serial bus (USB) device.

16. A client device, comprising:
    a memory configured to store an instruction; and
    a processor coupled to the memory, wherein the instruction causes the processor to be configured to:
        receive a data packet;
        obtain a serialization result and an interface name from the data packet;
        perform a deserialization operation on the serialization result to obtain an interface parameter corresponding to the interface name;
        reconstruct an interface invocation request based on the interface parameter and the interface name to generate a reconstructed interface invocation request;
        access a human interface device (HID) based on the reconstructed interface invocation request to obtain information about the HID; and
        send the information about the HID to a communications network.

17. The client device of claim 16, wherein in a manner of performing the deserialization operation on the serialization result to obtain the interface parameter corresponding to the interface name, the instruction further causes the processor to be configured to obtain the interface parameter based on bottom layer data corresponding to the interface parameter.

18. A computer program product comprising instructions for storage on a non-transitory computer-readable medium that, when executed by a processor, cause a virtual machine running on a server to:
    obtain an interface invocation request, wherein the interface invocation request comprises an interface name and an interface parameter, and wherein a virtual desktop infrastructure (VDI) comprises the server and a client device coupled to a human interface device (HID);

perform a serialization operation on the interface parameter to obtain a serialization result;

generate a data packet;

send the data packet to the client device using a communications network, wherein the data packet comprises the interface name and the serialization result;

receive the data packet to obtain the serialization result and the interface name;

perform a deserialization operation on the serialization result to obtain the interface parameter;

reconstruct the interface invocation request based on the interface parameter and the interface name to generate a reconstructed interface invocation request;

access the HID based on the reconstructed interface invocation request; and send information about the HID to the virtual machine.

19. The computer program product of claim 18, wherein the instructions cause the virtual machine running on the server to perform the serialization operation on the interface parameter to obtain the serialization result by obtaining bottom layer data corresponding to the interface parameter.

20. The computer program product of claim 19, wherein the instructions cause the virtual machine running on the server to perform the deserialization operation on the serialization result to obtain the interface parameter by obtaining the interface parameter based on the bottom layer data corresponding to the interface parameter.

* * * * *